US007920888B2

(12) United States Patent
Beming et al.

(10) Patent No.: US 7,920,888 B2
(45) Date of Patent: Apr. 5, 2011

(54) POWER CONTROL AND AUTOMATIC REPEAT REQUEST (ARQ) IN A RADIO COMMUNICATIONS SYSTEM

(75) Inventors: Per Beming, Stockholm (SE); Stefan Parkvall, Stockholm (SE); Kai-Erik Sunell, Sollentuna (SE); Eva Englund, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1251 days.

(21) Appl. No.: 10/550,561

(22) PCT Filed: Apr. 6, 2004

(86) PCT No.: PCT/SE2004/000541
§ 371 (c)(1),
(2), (4) Date: Sep. 1, 2006

(87) PCT Pub. No.: WO2004/091114
PCT Pub. Date: Oct. 21, 2004

(65) Prior Publication Data
US 2007/0049316 A1 Mar. 1, 2007

(30) Foreign Application Priority Data
Apr. 8, 2003 (SE) ...................................... 0301076

(51) Int. Cl.
*H04B 7/00* (2006.01)
(52) U.S. Cl. .......... 455/522; 455/67.11; 455/68; 455/69
(58) Field of Classification Search .................. 455/522, 455/67.11, 68–70, 115.3, 126, 127.1, 127.2, 455/135, 226.3, 277.2, 296; 370/318
See application file for complete search history.

(56) References Cited

U.S. PATENT DOCUMENTS
7,352,722 B2* 4/2008 Malladi et al. ................ 370/335
(Continued)

FOREIGN PATENT DOCUMENTS
WO WO 02065797 A1 8/2002
(Continued)

OTHER PUBLICATIONS
Swedish Patent Office, International Search Report for PCT/SE2004/000541, dated Jul. 6, 2004.

*Primary Examiner* — Dominic E Rego
(74) *Attorney, Agent, or Firm* — Roger S. Burleigh

(57) ABSTRACT

A radio network entity in charge of outer loop power control for a communication with a mobile radio is informed about erroneous data units, requested retransmissions, and/or data units transmission attempts associated with the data units sent by the mobile radio to the radio network. Another radio network entity, which sends a transmission power control signal to the mobile radio to control the mobile's transmit power level based on a target value, detects errors in data units received from the mobile radio and requests retransmission. Information associated with the requested retransmission is used to generate a revised target value. The target value may be revised by an outer loop power controller node or by an outer loop power controller entity in the same node as an ARQ entity that generates the information about erroneous data units, requested retransmissions, and/or data units transmission attempts associated with the data units sent by the mobile radio to the radio network.

34 Claims, 7 Drawing Sheets

U.S. PATENT DOCUMENTS

| | | | |
|---|---|---|---|
| 2002/0028691 A1* | 3/2002 | Moulsley et al. | 455/522 |
| 2002/0060997 A1* | 5/2002 | Hwang | 370/335 |
| 2002/0065086 A1* | 5/2002 | Vanttinen et al. | 455/456 |
| 2002/0080719 A1 | 6/2002 | Parkvall et al. | |
| 2002/0090965 A1* | 7/2002 | Chen et al. | 455/522 |
| 2003/0026324 A1* | 2/2003 | Li et al. | 375/141 |
| 2004/0116143 A1* | 6/2004 | Love et al. | 455/522 |
| 2006/0007896 A1* | 1/2006 | Grieco | 370/335 |
| 2006/0264220 A1* | 11/2006 | Chen et al. | 455/454 |
| 2008/0267123 A1* | 10/2008 | Zeira et al. | 370/329 |
| 2009/0129305 A1* | 5/2009 | Malkamaki | 370/311 |

FOREIGN PATENT DOCUMENTS

| | | |
|---|---|---|
| WO | WO 03017711 A1 | 2/2003 |

* cited by examiner

POWER CONTROL AND AUTOMATIC REPEAT REQUEST (ARQ) IN A RADIO COMMUNICATIONS SYSTEM

TECHNICAL FIELD

The present invention relates to radio communication systems, and more particularly, to power control and automatic repeat request (ARQ) in a radio communications system.

BACKGROUND

In cellular mobile radio communication systems, it is beneficial to reduce the transmitter powers of all transmitting mobile radios to the lowest possible level that still allows one or more radio base stations to receive the transmitted signals over noisy radio channels at an acceptable level. For example, Code Division Multiple Access (CDMA) systems employ such mobile transmit power level adjustments. None of the mobile terminals may transmit at a higher level than required to fulfill communication quality demands.

Uplink power control includes an inner loop and an outer loop. An important factor for power control is reliable communication quality measurement, i.e., measuring the quality of the radio communications channel over which the mobile is transmitting. Current systems use, for example, signal-to-interference ratio (SIR) or signal-to-noise ratio to (SNR) to measure channel quality. The inner power control (PC) loop tries to keep the SNR measured for the uplink channel at or close to some target SNR level. The SNR detected for the uplink information is compared with the target, and the mobile is sent power control commands to increase or decrease transmit power to reduce the comparison difference. The outer power controller loop tries to ensure that the errors in the data units received from the mobile radio are at or below an acceptable level. For example, block error rate (BLER) is used in many CDMA systems. The outer PC loop adjusts the inner loop SNR target level based on the uplink channel BLER. If the error rate is too high, the SNR target is increased, and if the error rate is too low, the SNR target is decreased.

The outer PC loop, uplink transmit power control mechanism is normally placed in a radio network controller due to soft handovers where multiple receiving nodes, e.g., base stations, are simultaneously involved in receiving data transmitted by a mobile radio. The inner PC loop is normally placed closer to the mobile radio, e.g., in the base station. As explained below, recent proposals for third generation cellular systems (3G) introducing an uplink retransmission protocol closer to the radio interface complicate the quality measurement information transfer, and therefore, negatively impact power control techniques-based on those measurements.

This problem is explained using FIG. 1 which shows a radio network 10 and a soft handover where two different radio base stations 20a and 20b receive uplink data units from the same transmitting mobile terminal 12. Two decoders 22a and 22b in the two base stations 20a and 20b decode the received data units. The decoded data units are delivered to a diversity combining unit 16 located in the radio network controller 14 to choose or generate from the two sets of data units a single stream of data units. The diversity combining is based on channel quality measurement data provided by the base stations 20a and 20b. In wideband CDMA (WCDMA), the measurement data includes cyclic redundancy checksum indicators (CRCIs) and quality estimates (QEs).

In general, the CRCI indicates the correctness/incorrectness of a data unit, and the QE represents the channel bit error rate (BER). More specifically, the CRCI indicates with very high reliability whether the data unit is erroneous. So a CRCI has only two possible values: the data unit is accurate or the data unit is not accurate. Because there is no ambiguity, the CRCI is an important input for the outer loop power controller 18 and for the diversity combining unit 16 which are both located in the RNC 14. If the diversity combining scheme receives two data units, where one data unit is indicated to be inaccurate and the other one is indicated to be accurate, then the combining scheme delivers the error-free data unit to higher layers and discards the erroneous one. The QE is a real number metric proportional to the experienced channel quality, and it can be used as a relative quality measure between two or more copies of the same data unit. Two data units may have the same CRCI but different QE values. In that case, the diversity-combining unit chooses the data unit with the highest QE, i.e., the data unit with the largest number of correct bits. This kind of diversity selection is useful for applications that can make use of "partly" erroneous/correct blocks, such as vocoders.

During soft handover, the mobile radio transmitter receives power control commands from two independent inner loop power controllers 24a and 24b. Recall that a main objective of the outer power control loop in WCDMA is to adjust the inner power control loop SNR target value so that the estimated block error rate (BLER) agrees with a target BLER value. The outer PC loop increases SNR if the BLER for the communication is too high and decreases the SNR if the BLER is too low. The outer loop power controller 18, located in the radio network controller, assigns the same SNR target for different (independent) inner loop power controllers 24a and 24b used during soft handover. The outer power control loop is driven by processed measurement data provided by the diversity combining unit 16.

A robust error control/correction scheme can be useful in reducing transmitter power levels, and one attractive error control technique is the class of automatic repeat request (ARQ) protocols that can guarantee reliable information transfer over extremely noisy radio channels. In ARQ, the receiver sends retransmission requests of erroneous data units, including missing data units, to the transmitter. Like outer loop power control functionality, ARQ functionality is normally placed in the radio network controller.

SUMMARY OF THE INVENTION

In order to make more efficient use of retransmissions, ARQ-based error correction schemes have been proposed to be located (or are actually located) closer to the radio interface, e.g., in the radio base station. In such configurations, erroneous data units are discarded and retransmitted. As a result, the diversity combining unit and the outer power control loop in the radio network controller never know about erroneous or missing data units, retransmissions, etc. Lacking this kind of data unit error information, the outer loop power controller 18 mistakenly assumes that the radio communication channel is better than it really is, and mistakenly lowers the SNR target value. This misinformed action results in even more transmission errors, lower communication quality, and decreased throughput because of increased data unit retransmissions.

These problems are avoided by informing a node or entity in charge of outer loop power control about data unit error information, requested retransmissions, and/or data unit transmission attempts. A first radio network entity sends a transmission power control signal to the mobile radio to control a power level at which the mobile radio transmits data units over the communications channel based on a target value. That first entity detects one or more errors in one or more data units received from the mobile radio and requests retransmission of one or more data units. Information associated with the error(s) and/or requested retransmission is provided to a second radio network entity which generates a revised target value based on the error or retransmission information.

The target value may be increased if the received information reveals an increase in errors and/or requested retransmissions or decreased if the received information reveals a decrease in errors and/or requested retransmissions. An increased target value causes the first radio network entity to send one or more increase transmission power control signals to the mobile radio. A decreased target value causes the first radio network entity to send one or more decrease transmission power control signals to the mobile radio.

When the first radio network entity detects a missing or erroneous data unit, the first entity sends a negative acknowledgement to the mobile radio, and in one example embodiment, an error event indicator to the second radio network entity. The second radio network entity uses one or more error event indicators in determining whether or when to adjust the target value. In one example, the second radio network entity determines a transmission attempt failure rate estimate for the communication using one or more error event indicators and generates the revised target value to reduce a difference between the actual transmission attempt failure rate estimate and a desired transmission attempt failure rate. The second entity preferably ensures that error event indicators received from plural first entities for the same data unit are only interpreted as one error event indicator.

In an alternative example embodiment, the first entity sends a bit map associated with the communication indicating a number of decoding failures for one or more received data units to the second radio network entity. Given the size of a bit map, it may be advantageous to process the bit map to reduce the amount of information before it is sent to the second radio network entity. The processed information may also include statistical information provided by the mobile radio or the first radio network entity.

By informing a node or an entity in charge of outer loop power control about erroneously received data units from a mobile radio, requested retransmissions, and/or data unit transmission attempts, the outer loop power controller has a more accurate assessment of the radio communication channel quality. As a result, the outer loop power controller more accurately establishes an appropriate signal-to-noise ratio target value (or other target value) for use by the inner loop power controller entity. This results in better communication quality, increased throughput because of decreased data unit retransmission, and appropriate (neither too much nor too little) radio resource allocation to a particular communication to achieve acceptable or other desired quality of service objectives. In addition, ARQ protocol functionality can be located much closer to the radio interface without negatively impacting outer loop power control. The increased accuracy of the outer loop can reduce mobile transmitter power and cell interference as well as prolong mobile battery lifetime.

In an alternative example embodiment, the SNR target obtained from the outer loop power controller is adjusted or replaced directly in each base station involved in the soft handover. This SNR target adjustment is preferably based on a combined data unit decoding generated using the decoding results from each soft handover base station to avoid base station "drift." Target SNR drift would result in the mobile terminal power being adjusted relative to the poorest radio link rather than that of the best radio link, and ultimately, excessive mobile power. The soft handover base stations may be preferably informed of the combined base station decoding for each data unit using a "new data indicator" (NDI) signal from the mobile radio. This NDI may be signaled with each data unit to inform each soft handover base station whether the data unit is a retransmission of a previously-transmitted data unit or a first-transmission of a new data unit. The SNR target is then adjusted in each base station based on the decoding outcome in combination with the new data indicators from the mobile terminal. For example, if a decoding attempt in a first handover base station fails and the new data indicator for the next transmission still indicates a new data unit, this means that a second handover base station succeeded in decoding the data unit. The first handover base station concludes that the handover transmission was successful. If the rate of receiving new data indicators reveals a retransmission rate larger than desirable, each soft handover base station may increase its SNR target, but if the retransmission rate is too low, each soft handover base station may decrease its the SNR target to save power.

DETAILED DESCRIPTION

The following descriptions set forth specific details, such as particular embodiments, procedures, techniques, etc., for purposes of explanation and not limitation. However, it will be apparent to one skilled in the art that other embodiments may be employed to depart from these specific details. For example, although the following description is facilitated using an example application to 3G wideband CDMA (WCDMA), the invention is applicable to other cellular systems and standards including any 2½G, 3G, or 4G system.

In some instances, detailed descriptions of well-known methods, interfaces, devices, and signaling techniques are omitted so as not to obscure the description with unnecessary detail. Moreover, individual function blocks are shown in some of the figures. Those skilled in the art will appreciate that the functions may be implemented using individual hardware circuits, using software programs and data in conjunction with a suitably programmed digital microprocessor or general purpose computer, using an application specific integrated circuit (ASIC), and/or using one or more digital signal processors (DSPs).

For purposes of this description, an erroneous data unit includes a data unit that has one or more errors or a missing data unit, i.e., a data unit that was transmitted by the mobile radio but not received by the radio network receiving entity. A radio network node defines a structure that is physically distinct and separate from the structure of another node. An entity may correspond to a network node or to software or hardware (or both) functionality contained within a node. Although different entities may be located in different nodes, different entities may also be located in the same node. For purposes of this description, automatic repeat request (ARQ) encompasses any retransmission, error correction, or error control protocol.

Figure 1:
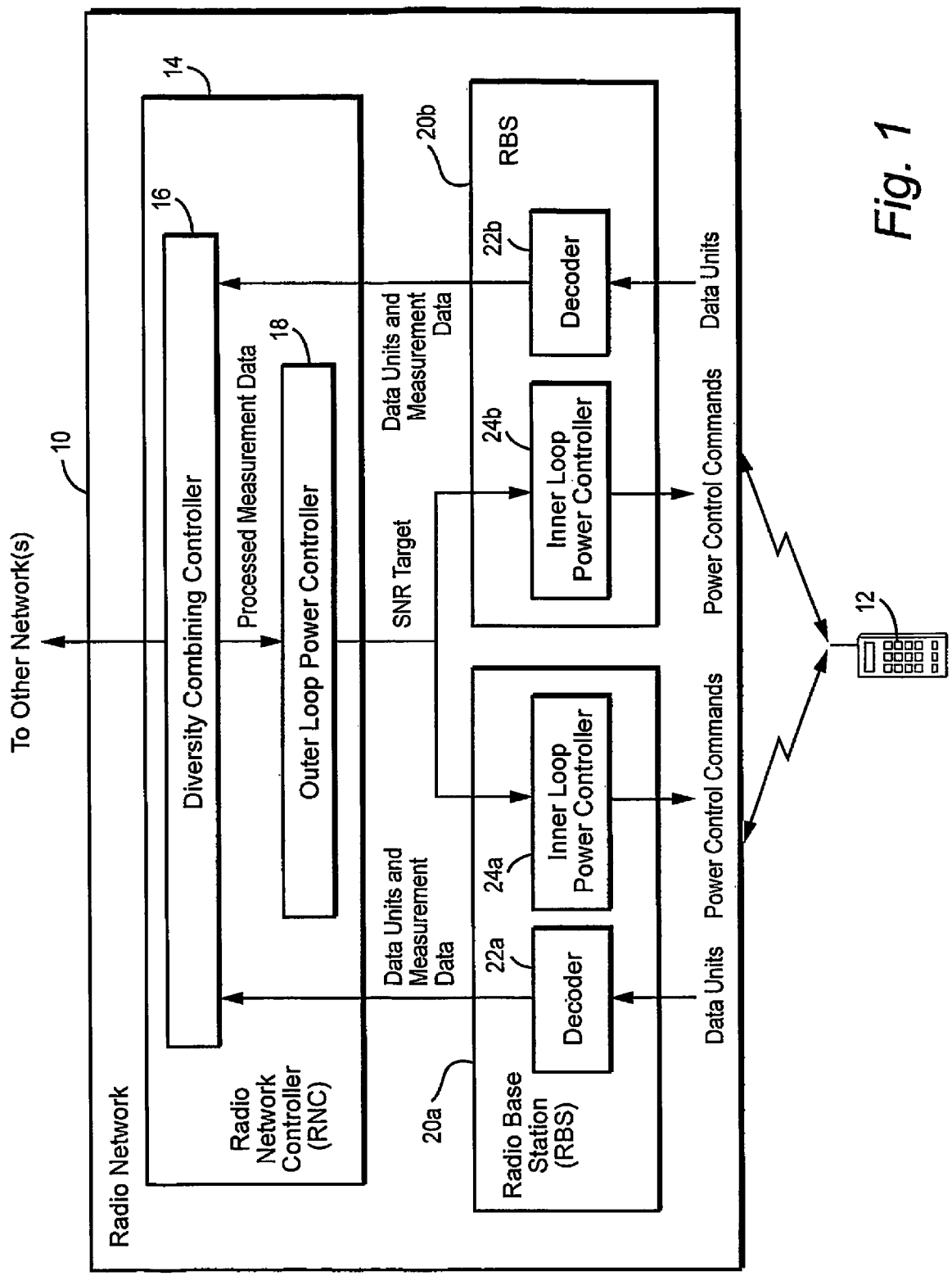
FIG. 1 illustrates radio communications system described in the background section.
Figure 2:
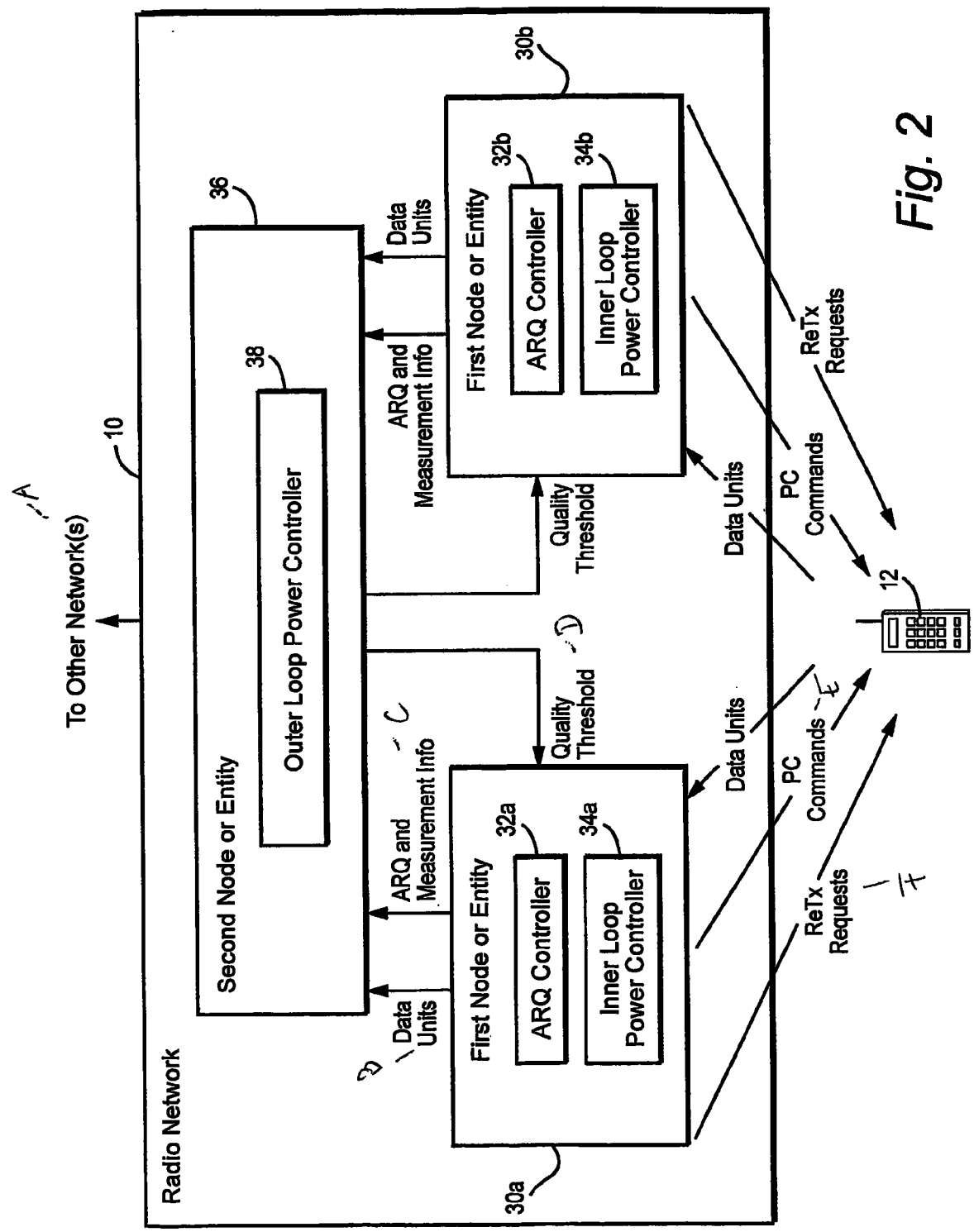
FIG. 2 illustrates an example radio communications system for power and error control.

Reference is now made to the radio communications system shown in function block format in FIG. 2. A radio network 10 is coupled to one or more other networks and to one or more mobile radios. Only one mobile radio 12 is shown to simplify the illustration and explanation. Mobile radio 12 is currently shown in a soft handover communication with the radio network in which one branch or leg of the soft handover communication is supported with a first node or entity 30a and the other branch of the soft handover communication is supported by another first node or entity 30b. The mobile radio 12 transmits data units in the uplink direction which are received by both first nodes or entities 30a and 30b. Each first node or entity 30a and 30b includes an inner loop power controller 34a and 34b, respectively, which transmits power control commands, e.g., an incremental power increase or decrease command, in the downlink direction to the mobile radio 12. The inner loop power controllers 34a and 34b detect the signal-to-noise ratio (SNR) (or other signal quality measure like signal-to-interference ratio (SIR)) of the uplink radio channel communication from the mobile radio 12. That detected SNR value is compared to an SNR target level received from an outer loop power controller 38 located in a second radio network node or entity 36. While SNR or SIR targets may be used, other channel quality measurements may be used to set the target or threshold level. Although there may be variations in implementation details, each inner loop power controller 34 generally sends a power increase command if the detected SNR is below the target SNR and a power decrease command if the detected SNR exceeds the target SNR level. Preferably, the mobile radio 12 only increases its transmit power if the power control commands from both first nodes or entities 30a and 30b send increase power control commands.

As explained earlier, the outer loop power controller 38 tries to ensure that the errors in data units received from the mobile radio are at or below an acceptable level. For purposes of this example only, transmission attempt failure rate is used to explain one, non-limiting way to measure such data unit errors. The outer loop power controller 38 adjusts the inner PC loop SNR target level based on a determined uplink channel block error rate. If that block rate error rate is too high, the outer loop power controller 38 increases the SNR target, and if that error rate is too low, the SNR target is decreased.

The first node or entities 30a and 30b, in addition to performing inner loop power control and passing correct or corrected data units to the second node or entity 36, each include an ARQ controller 32a and 32b, respectively. Each ARQ controller 32a and 32b detects one or more errors in received data units from the mobile radio and either corrects those errors or requests retransmission. The inner loop power controllers 34a and 34b provide measurement information to the second node or entity 36 that may be used in performing certain operations such as diversity combining. The ARQ controllers 32a and 32b also provide ARQ information to the second node or entity in which outer loop power control is performed. In this example the outer loop power controller 38 is located in a second node 36 separate from the first nodes 30a, and 30b. In alternative embodiments, the first and second entities may be in the same node. The ARQ information ensures that the outer loop power controller 38 is aware of the erroneous data unit detected at the first nodes or entities. In one example, this ARQ information may include one or more of the following: specific information about specific data unit errors, data unit errors related to "soft-combining" possibly used in the decoder, retransmission information related to requested retransmissions for particular data units, and data unit transmission attempt information. The outer loop power controller 38 uses this ARQ information in determining a signal quality target, e.g., a signal-to-noise ratio target, for the inner loop power controllers 34a and 34b.

Figure 3:
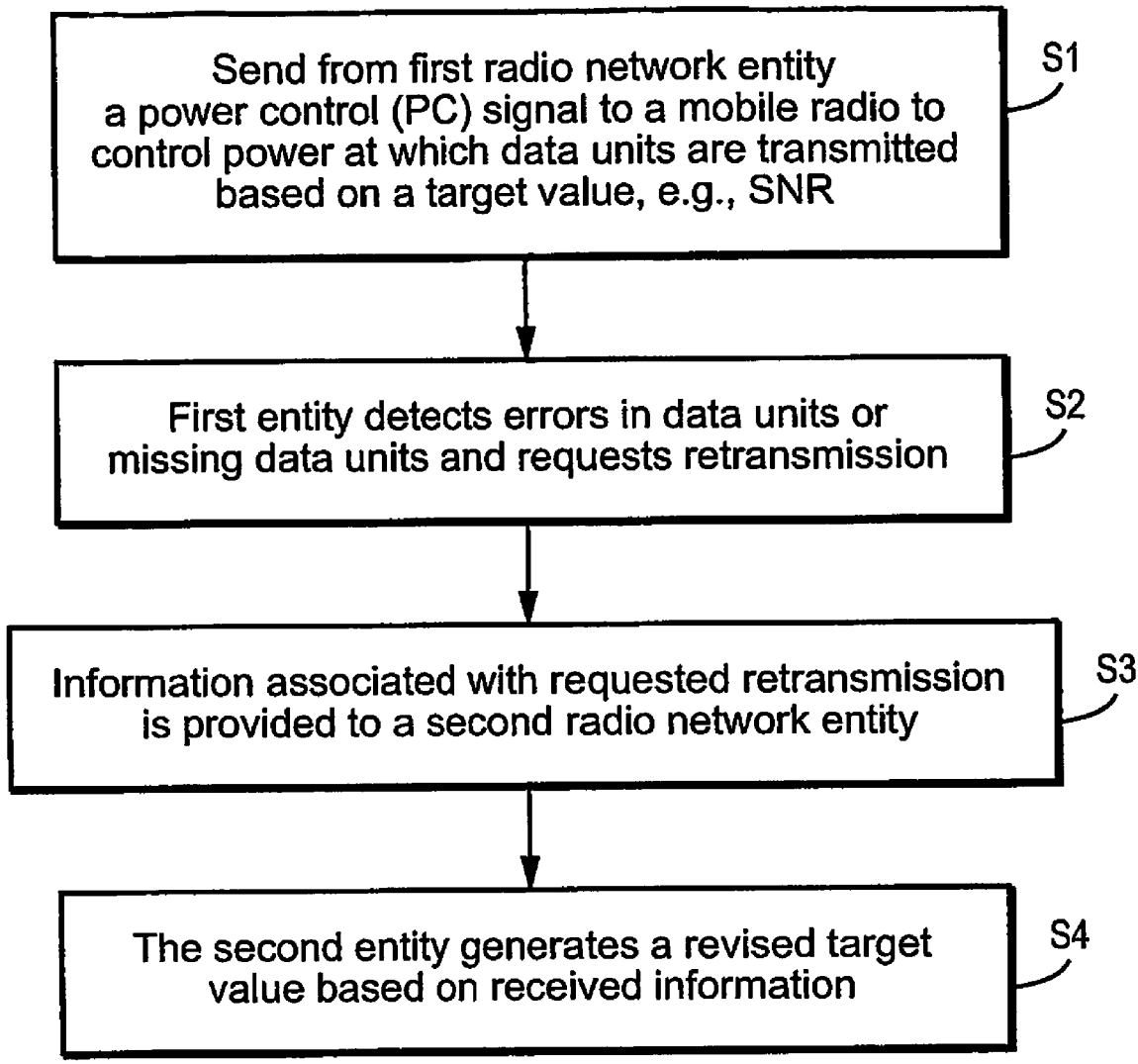
FIG. 3 is a flow chart diagram illustrating procedures for use in the system described in FIG. 2 describing one example way in which information associated with requested retransmissions is provided to a second radio network entity that provides target value information to a mobile radio power control entity.

Reference is made to the flow chart diagram in FIG. 3 which illustrates certain procedures performed by the nodes or entities in FIG. 2. Each first radio network entity sends one or more power control signals to a mobile radio to control the power at which data units are transmitted by the mobile station to the radio network over an uplink communications channel (step S1). Those power control commands are based on a comparison of a detected signal quality of the uplink communication with a target signal quality value, e.g., SNR. The first entity detects errors in one or more data units (or missing data units) and requests retransmission (step S2). Information associated with requested retransmission is provided to a second radio network entity (step S3). The second entity generates a revised target value based on the received information and provides that target value to the first radio network entity (step S4).

Figure 4:
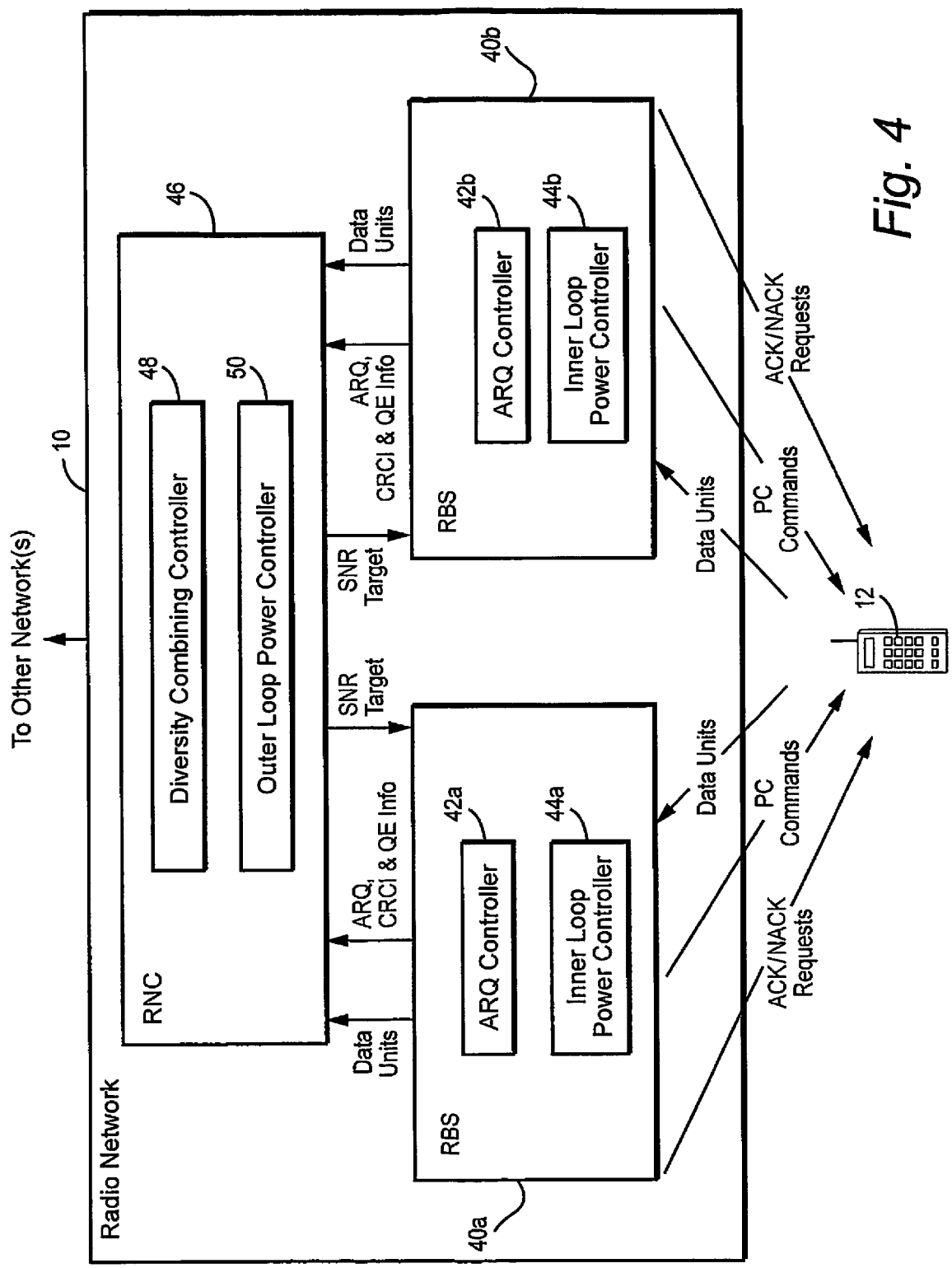
FIG. 4 illustrates an example 3G radio network implementation including a radio network controller node and plural radio base station nodes.

FIG. 4 shows an embodiment in the context of a 3G-type CDMA radio network. This 3G application is simply one example and not in any way limiting. The radio network 10 includes a radio network controller (RNC) 46 coupled to two radio base stations (RBSs) 40a and 40b. The RNC 46 includes a diversity combining controller 48 and an outer loop power controller 50. Each RBS 40a and 40b includes a corresponding ARQ controller 42a and 42b as well as a corresponding inner loop power controller 44a and 44b. The mobile radio 12 is shown in a diversity handover communication sending data units to both radio base stations in the uplink direction and receiving power control commands and selective retransmission requests (as needed) from each radio base station 40a and 40b.

Each radio base station provides correct or corrected data units to the RNC as well as channel quality measurement information and ARQ information. In this example, the channel quality measurement information, which is used by the diversity combining controller 48, includes Cyclic Redundancy Checksum Indicators (CRCIs) and Quality Estimates (QEs), as described in the background section. The CRCI information and QE information may also be provided to the outer loop power controller 50 along with the ARQ information such as data unit transmission attempts, retransmissions, and data unit error information.

However, if soft combining is employed at the radio base station to decode erroneously-received copies of a data unit, then additional information may be sent to indicate that soft combining was performed. If soft combining is used, then a conventional BLER computation will not reflect the actual BLER. For example, if none of the received data units can be decoded alone, the BLER is 100%. But an error free data unit nevertheless might be obtained by soft combining two or more erroneous data units. In this case, the additional soft combining information forwarded by the base station may include how frequently the first data unit transmission attempt tends to fail, how frequently the second attempt tends fails, how frequently the third attempt tends to fail, and so on. In one example, this soft combining information could be provided as or used to generate a table about the failure rate conditioned on the number of transmission attempts.

Ultimately, the target SNR or other target value is determined using the ARQ information. Non-limiting examples of providing ARQ information to the outer loop power controller 50 are now described.

As soon as an error-free transport block data unit (one example of a data unit in WCDMA is a transport block) is obtained, each radio base station 40a and 40b sends an acknowledgement (ACK) to the mobile radio 12 and forwards the data unit to the radio network controller 46. Otherwise, a negative acknowledgement (NACK) is sent to the mobile radio 12, and an error-event indicator bit is sent to the radio network controller 46. The error-event indicator bit is used by the outer loop power controller 50 in order to estimate the number of transmission attempt failure rates.

One example way of doing this is now described. For simplicity, the example is limited to a situation where the number of transmission attempts is limited to two, the mobile may only make one retransmission. Assume a set of data units: $U=\{u1, u2, u3, u4, \ldots\}$ and a set of time slots or distinct instants of time $T=\{t1, t2, t3, t4, \ldots\}$. Assume that the mobile radio makes a data unit transmission attempt for each time slot, and each radio base station computes a CRC indicator for each attempt. Define a set of indicators $I=\{i1, i2, i3, i4, \ldots\}$, where i1 is the outcome of a CRC computation for the time slot t1, i2 is the outcome of a CRC computation for the time slot t2, and so on. Moreover, the outcome i1 is "1" if the CRC computation fails for the time slot t1 and "0" otherwise, the outcome i2 is "1" if the CRC computation fails for the time slot t2 and "0" otherwise, and so on.

The mobile radio 12 starts sending the first data unit u1. Assume that the CRC computation in the RBS fails, and therefore, i1=1. The RBS sends the indicator i1 to the RNC, which means that the initial transmission attempt failed with a rate of 100%, i.e., the mobile radio sent one data unit, and it failed. Because one data unit estimate is of questionable value; more statistics should be obtained before the outer loop power controller 50 computes a new SNR target value for the inner loop power controllers 44a and 44b.

Next, the mobile radio 12 receives a negative acknowledgment from RBS 40a because the data unit u1 was not correctly decoded in RBS 40a. For simplicity, assume that the base station-to-mobile radio response is immediate, and therefore, the mobile radio retransmits u1 in the next time slot t2. The RBS 40a receives the retransmitted data unit u1 in the timeslot t2. Again, a CRC is computed generating i2. Assume that the CRC is successful this time, and thus, the RBS 40a sends both the decoded data unit u1 and the indicator i2 to the RNC 46. The RNC knows that the CRC has been computed twice; once for the time slot t1, and once for the time slot t2 having received two indicators—i1 and i2. The indicators i1 and i2 show that the CRC failed once and succeeded once. The RNC then determines the transmission failure rate information that indicates that the first attempt fails with a rate of 100% and that the first retransmission "fails" with a rate of 0%, i.e., the retransmission was successful. This information is used by the outer loop control in order to adjust the SNR target.

In a soft handover, error-event indicator bits from several different receiving nodes may be combined using one or more logical operations, e.g., an AND operation, to ensure that the same error event is not counted more than once. For example, we denote the two receiving base stations 40a and 40b as BS1 and BS2, respectively. The notation for set I defined above is refined as follows:

I1=$\{i11, i21, i31, i41, \ldots\}$, where i11 is the outcome of CRC computation for the time slot t1 at the BS1, i21 is the outcome of CRC computation for the time slot t2 at the BS1, and so on. Similarly, I2=$\{i12, i22, i32, i42, \ldots\}$, where i12 is the outcome of CRC computation for the time slot t1 at the BS2, i22 is the outcome of CRC computation for the time slot t2 at the BS2, and so on. Assume as in the previous example that the first transmission attempt fails in both BSs. This means the RNC receives two indicators i11 and i12 that indicate the outcome for the time slot t1. Further assume that after the retransmission, the CRC computation fails in the BS1 but succeeds in the BS2 for the data unit u1. Now the RNC receives four indicators i11, i12, i21, and i22. Only one of the indicators equals zero, and the rest equal one. If the transmission failure rate is estimated as before, then the first attempt fails with a rate of 100% whereas the retransmission fails with a rate of 50%. This is clearly wrong. Although one of retransmission attempts failed, the correct value for the retransmission failure is 0% because one of the retransmitted data units was correctly decoded at one of the soft handover base stations. The correct transmission failure rate is obtained by performing an AND operation between error-event indicators received from different base stations that indicates the outcome from CRC computation of the same time slot. In this example, the transmission failure rate for the initial transmission attempt is i11*i21=100% and for the retransmission attempts it is i12*i22=0%, since i11*i21=1 and i12*i22=0.

As another example of ARQ information, particularly since decoding failure events can be frequent, each base station can send, on regular basis, a bitmap that indicates the number of decoding failures for the forwarded transport blocks to the radio network controller. Such a bitmap may simply be a list of CRC indicators for several consecutive time slots. The bitmap approach may be useful if individual indicators are not sent from a base station to the RNC. The BS waits some time period (or until it has collected enough data) and then sends the bit map to the RNC, which may be a more efficient use of transport network resources. For example, it is inefficient to transfer a one bit error-event indicator if the transfer requires 10 overhead bits. In our example, after waiting two timeslots, BS1 sends a bitmap $\{i11, i12\}$ to the RNC and BS2 sends a bitmap $\{i21, i22\}$ to the RNC together with the successfully received data unit u1.

The outer loop power controller 50 uses received bitmaps to computes the transmission failure rate. If the outer loop power controller 50 receives bit maps from one BS, then the transmission failure rate may be computed as described earlier in the first example, i.e., the initial transmission attempt fails with a rate of 100%. In soft handover, bitmaps from several different receiving nodes are combined, and the transmission failure rate is determined as in the second example, i.e., the initial transmission attempts fails with a rate of (i11*i21)*100=100% and the retransmission "fails" with a rate of (i12*i22)/*100=0%. This ensures that the same transmission attempt failures are not counted more than once. The indicators are numbered to indicate the CRC outcome for certain time slots, and therefore, it is possible to avoid the error that was made in the second example, i.e., the value of 50% failure rate is not used for the retransmission attempt.

Because bitmaps can be sometimes very large, it can be useful to process bit map information in the base station to reduce the amount of data transferred to the RNC. The BS may compute some statistical values from the data that represent a transmission attempt failure rate. For example, individual base stations estimate and report the failure rates to the RNC. The failure estimate in the BS1 is 100% for the initial transmission attempt and 100% for the retransmission. Similarly, failure rate estimate in the BS2 is 100% for the initial transmission attempt and 0% for the retransmission. Again, caution must be exercised to avoid over-estimation of transmission failure rates because some of the error events may be counted more than once. For example, assume the RNC receives estimates from two base stations, where one base station indicates that the retransmission fails with a rate of 100%, whereas the other base station indicates that it fails with a rate of 0%. Regardless of how the RNC combines these two numbers, the result will be greater than 0% unless it omits the first failure value. But the correct value is 0%, and thus, the transmission failure rate is overestimated.

Decoding error statistics used for transmission attempt failure rate estimation can be determined using transmission attempt statistics already available at the mobile radio and delivered to the outer loop power controller 50. This approach avoids combining and/or over-estimation problems. If both base stations respond with a data unit acknowledgement, then the mobile radio transmits the next data unit. If one base station sends a data unit acknowledgement, and another base station sends a negative acknowledgement, then the mobile radio also transmits the next data unit. But if both base stations send a negative acknowledgement, then the mobile radio retransmits that data unit. Further, all the base stations involved in the decoding will be informed of a retransmission through the new data indicator, and thus, the mobile radio knows how many times the CRC failed.

Figure 5:
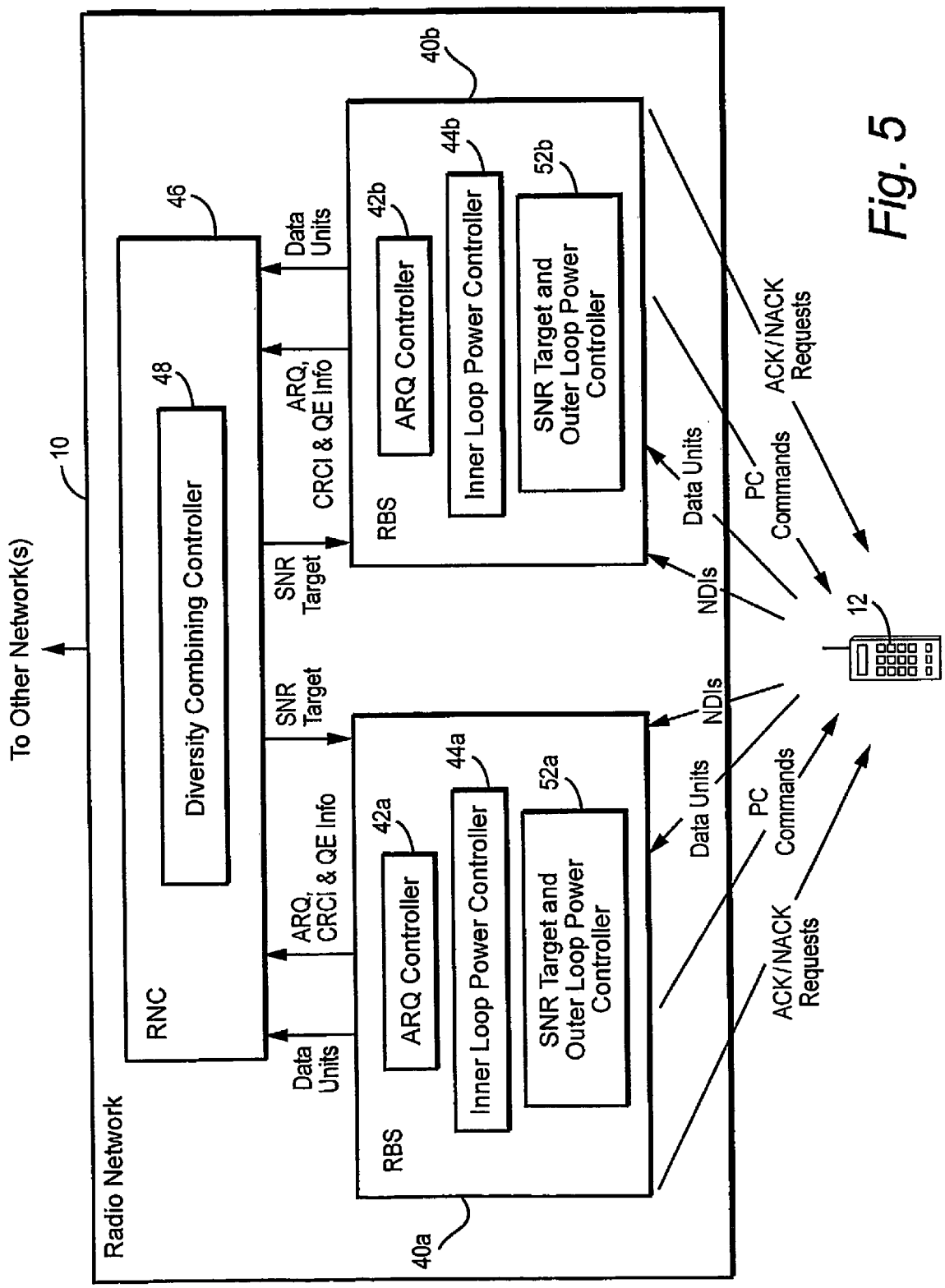
FIG. 5 illustrates another example 3G radio network implementation including a radio network controller node and plural radio base station nodes.

An alternative embodiment in the non-limiting context of a 3G system is shown in FIG. 5. The outer loop and inner loop power control functions are performed in each soft handover base station. The RNC 46 does not perform the outer loop power control functions. Here, the SNR target can be adjusted directly in the radio base station by an SNR target and outer loop power controller 52a, 52b using one or more new data indicators (NDIs) received from the mobile radio in combination with ACK/NACK information and/or other decoding information. In soft handover, the SNR target is preferably adjusted according to combined error events so that the SNR target is increased only if an error rate after diversity combining is too high. The SNR target is not adjusted for an individual soft handover base station based only on error events detected for the communication link between the mobile radio and that base station.

The data units transmitted from the mobile terminal 12 are decoded in each radio base station communicating with the mobile terminal, and the result of each decoding attempt is signaled (ACK/NACK) to the mobile terminal. The mobile radio terminal combines the ACK/NACK signals from each base station for each data unit sent and retransmits that data unit only if none of the soft handover base stations could decode the transmission. In other words, retransmission occurs only if each soft handover base station returns a NACK.

The mobile terminal informs each soft handover base station of the combined decoding outcome, i.e., the decoding results for a data unit from each handover base station are combined. This information is conveyed by indicating whether each data unit transmitted by the mobile terminal is a retransmission or an initial transmission containing new data. Such an indicator from the mobile terminal is referred to as a new data indicator (NDI).

The base station SNR controllers 52a and 52b each adjust the target SNR based on the data unit decoding outcomes from each handover base station and on the new data indicators sent from the mobile terminal to each handover base station associated with this data unit. The SNR target for all the soft handover base stations is preferably also coordinated through the new data indicator. A non-limiting example is now described to show how the base station can adjust the SNR target using the NDI.

Each soft handover base station monitors the new data indicator for a received data unit. Each time the new data indicator indicates a retransmission, the SNR target is increased by a step size. This step size may be predefined or may depend on a number of failed transmission attempts. Each time the new data indicator indicates a successful transmission, the SNR target is decreased by a step size such that the resulting error rate converges to the desired value. When the new data indicator indicates a successful data unit transmission, each base station SNR target controller 52 decreases the SNR target, even though one or more of those base stations may have failed to decode the data unit. This unified response to the NDI ensures coordinated SNR target setting and prevents SNR target "drift."

In another example, each soft handover base station may record received NDIs and statistically average or filter the NDIs before adjusting the SNR target. The number of failed transmission attempts may be used to weight the error events in such an averaging or filtering. For example, if the transmission of the same data unit fails several times, this error event can be weighted more heavily.

When an NDI is sent over the radio interface, it will likely be subjected to corrupting influences. If a base station decodes a data unit but still receives an NDI indicating a retransmission for that data unit, then either the NACK has been misinterpreted or the NDI is in error. The NDI reliability can be taken into account as part of the SNR target adjusting process. For example, if the NDI is detected as reliable, the NACK was likely misinterpreted, suggesting poor downlink signal quality. Poor downlink quality does not necessarily mean the SNR target for the uplink signal transmissions needs to be increased. On the other hand, if the NDI signal is unreliable, the SNR target could be increased to improve up link signaling quality.

Figure 6:
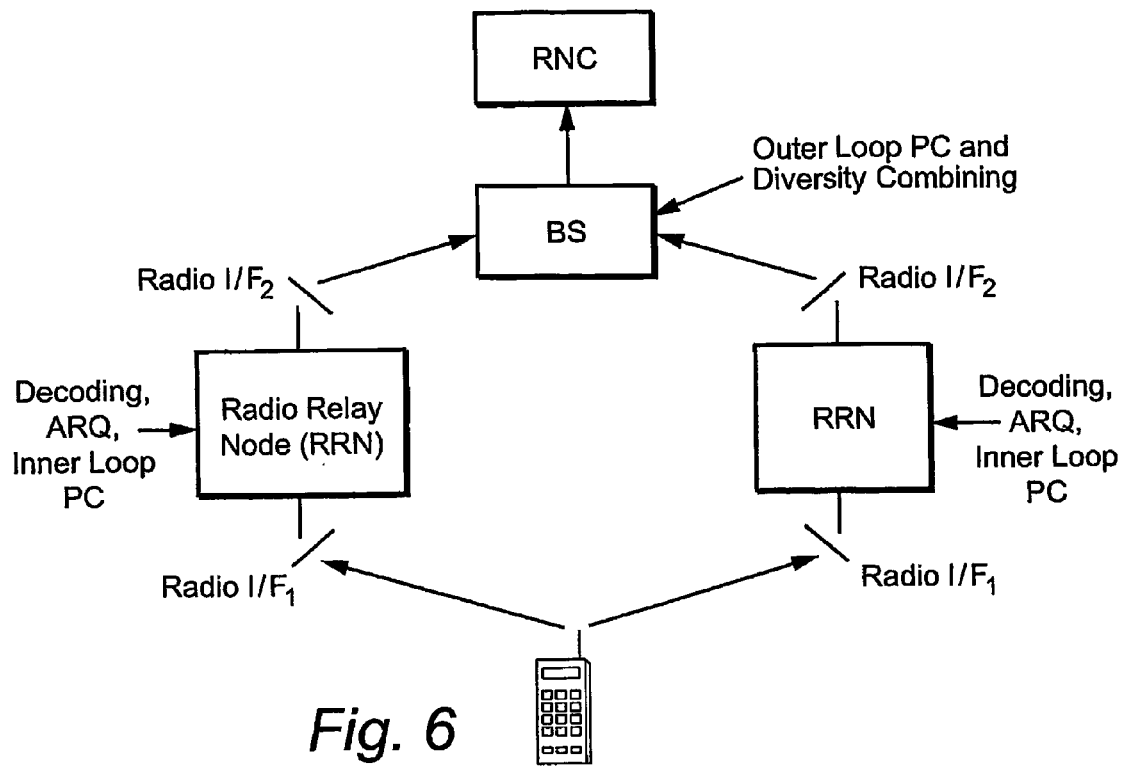
FIG. 6 illustrates an example implementation including radio relay nodes.

There are a variety of other configurations and implementations. As cellular communication systems evolve, e.g., from 3G to 4G, variations on the above are readily accommodated. For example, FIG. 6 shows radio relay nodes (RRNs) placed between the mobile radio and the based radio base station. There is a first radio interface (I/F$_1$) between the mobile radio and the radio relay nodes and a second radio interface (I/F$_2$) between the radio relay nodes and-the radio base station. The radio relay nodes may perform data unit decoding, ARQ, inner loop power control, and while outer loop power control and diversity combining may be performed in the base station. If inner loop power control and ARQ are performed in the radio relay nodes, the same problems described above exist. For example, if the ARQ entity in the radio relay node discards every data unit that fails, the outer loop power controller in the base station can not compute a proper power control target because it receives only error-free data blocks and therefore erroneously assigns low power control targets.

Figure 7:
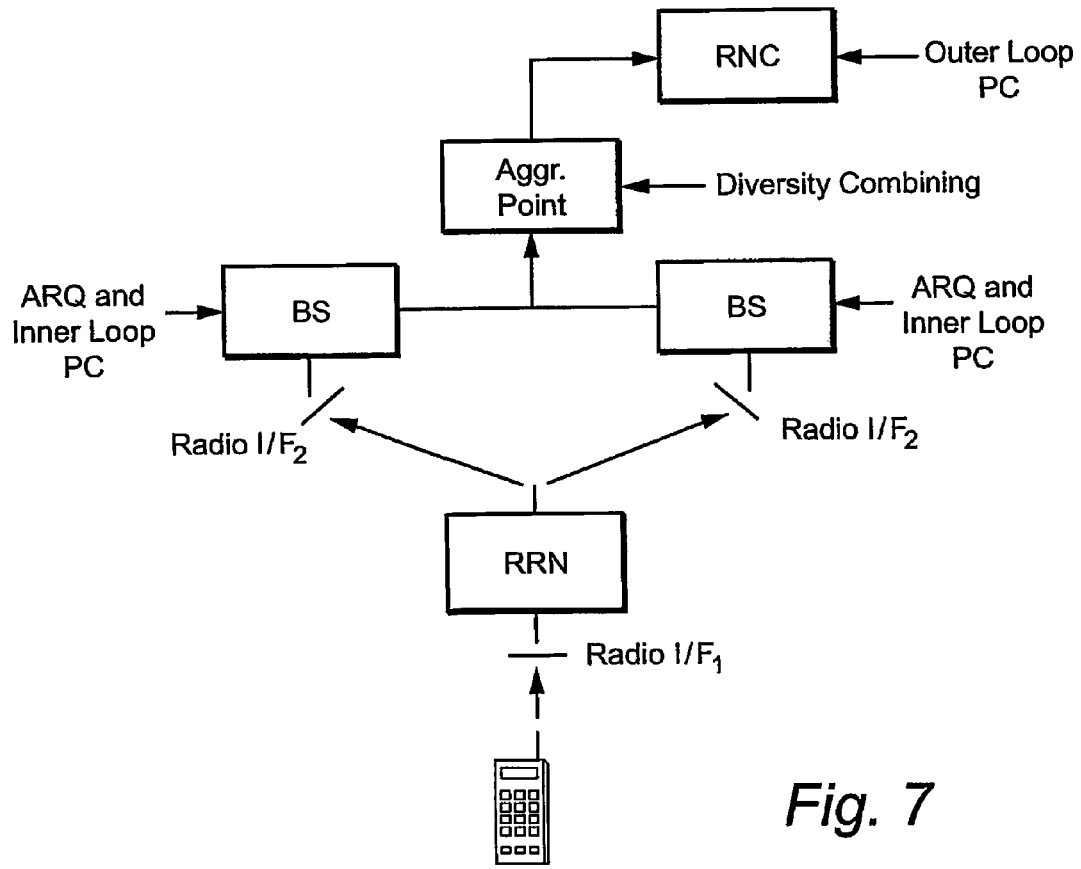
FIG. 7 illustrates an example implementation including an aggregation point for performing diversity combining functionality functions and a radio relay node.
Figure 8:
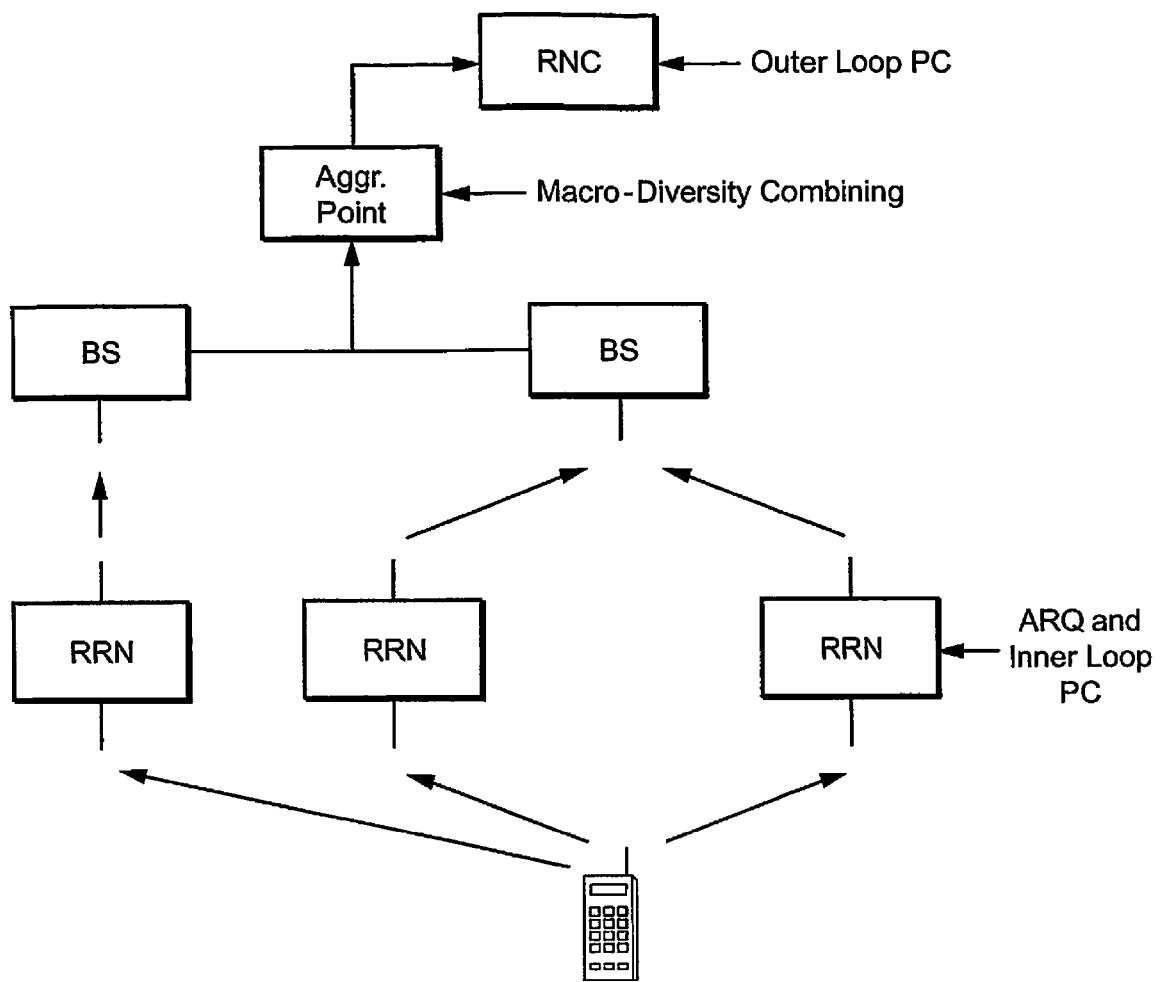
FIG. 8 illustrates an other example implementation including that includes an aggregation point and multiple radio relay nodes.

The outer loop power control and/or the diversity combining functionality may be placed in the RNC. Indeed, the diversity combining functionality may be located in an aggregation point somewhere between the base station and radio network controller even though the outer loop power control scheme may still be located in the RNC as shown in FIG. 6. In some situations, it might even be beneficial to move the diversity combining functionality from one node to an other while the mobile radio moves while keeping the outer loop power control in the same node. FIG. 7 shows yet another example configuration in which radio mobile signals can be received by several radio relay nodes which in turn may be in soft handover with one or more radio base stations.

FIG. 7 shows the ARQ and inner loop power control functions indicated in radio relay nodes, the macro diversity combining in the aggregation point between the base stations and the radio network controller, and the outer loop power control functionality in the radio network controller. Although other implementations likely exist, the point of showing these example implementations is that the basic functionalities described here need not be in a particular node.

In summary, the uplink outer loop power control functionality productively uses information related to data units errors when a retransmission or other error control protocol is introduced between the outer loop power controller and the data unit decoder. It is therefore possible to concurrently make use of accurate outer loop power control and fast retransmission protocols even though their different functionalities are located in different network nodes or entities.

While practical and preferred embodiments have been described, it is to be understood that the invention is not to be limited to any disclosed embodiment, but on the contrary, is intended to cover various modifications and equivalent arrangements included within the scope of the appended claims.

The invention claimed is:

1. A method in a communication system, comprising the steps of:
   sending at a first radio network entity a transmission power control signal to a mobile radio to control a power level at which the mobile radio transmits data units over the communications channel based on a target value;
   detecting at the first radio network entity one or more errors in one or more data units received from the mobile radio and requesting retransmission of one or more data units; and,
   providing information associated with the requested retransmission to a second radio network entity for generating a revised target value based on the received information in the second radio network entity;
   wherein when the first radio network entity processes one or more bit maps associated with the communication indicating a number of decoding failures for one or more received data units and sends processed information resulting from the processing to the second radio network entity, wherein the processed information is less data than the one or more bit maps.

2. The method in claim 1, wherein the provided information includes information relating to a number of data unit transmission attempts over the communications channel.

3. The method in claim 1, wherein the provided information includes information indicating one or more data units received in which one or more errors was detected or one or more data units was not received.

4. The method in claim 3, wherein the provided information includes one or both of cyclic redundancy check information and quality estimate information for data units transmitted over the communications channel.

5. The method in claim 4, wherein the communication is a diversity handover communication including two or more handover links between two or more base stations and the mobile radio, the method further comprising:
   the second radio network entity performing diversity combining of one or more data units received over the two or more handover links based on one or both of the cyclic redundancy check information and the quality estimate information.

6. The method in claim 1, further comprising the steps of:
   increasing the target value if the received information reveals an increase in requested retransmissions, and
   decreasing the target value if the received information reveals a decrease in requested retransmissions,
   wherein an increased target value causes the first radio network entity to send one or more increase transmission power control signals to the mobile radio, and a decreased target value causes the first radio network entity to send one or more decrease transmission power control signals to the mobile radio.

7. The method in claim 1, wherein the target value is a signal-to-noise ratio or a signal-to-interference ratio.

8. The method in claim 1, wherein the detecting includes detecting signal quality information and cyclic redundancy check information for data units received over the communications channel.

9. The method in claim 1, wherein when the first radio network entity sends a bit map associated with the communication indicating a number of decoding failures for one or more received data units to the second radio network entity.

10. The method in claim 9, wherein the second radio network entity combines bit map information received from plural first entities for the same data unit.

11. The method in claim 1, wherein the processed information includes statistical information provided by the mobile radio or the first radio network entity.

12. The method in claim 1, wherein the provided information includes statistical information provided by the mobile radio.

13. The method in claim 1, wherein the first and second radio network entities are located in different radio network nodes.

14. The method in claim 1, wherein the first and second radio network entities are located in a same radio network node.

15. The method in claim 14, wherein the second radio network entity generates the revised target based on the received information and a new data indicator (NDI) communicated by the mobile radio indicating whether a data unit is a new data unit or a retransmitted data unit.

16. The method in claim 15, wherein the second radio network node is a base station, the mobile radio communication is a soft handover communication involving first and second base stations, and the NDI indicates a decoding result of the data unit taking into account a data unit decoding at the first base station and a data unit decoding at the second base station.

17. A method in a communication System, comprising the steps of:
   sending at a first radio network entity a transmission power control signal to a mobile radio to control a power level at which the mobile radio transmits data units over the communications channel based on a target value;

detecting at the first radio network entity one or more errors in one or more data units received from the mobile radio and requesting retransmission of one or more data units; and, providing information associated with the requested retransmission to a second radio network entity for generating a revised target value based on the received information in the second radio network entity;

wherein when the first radio network entity detects a missing or erroneous data unit, the first radio network entity sends a negative acknowledgement to the mobile radio and an error event indicator to the second radio network entity.

18. A radio network for communicating with a mobile radio communication over a communications channel, comprising:

first means in a first radio network entity for sending a transmission power control signal to the mobile radio to control a power level at which the mobile radio transmits data units over the communications channel based on a target value;

second means in the first radio network entity for detecting one or more errors in one or more data units received from the mobile radio and requesting retransmission of one or more data units;

third means for providing information associated with the requested retransmission to a second radio network entity; and, fourth means in the second radio network entity for generating a revised target value based on the received information;

wherein when the first radio network entity includes means for processing one or more bit maps associated with the communication indicating a number of decoding failures for one or more received data units and sending processed information resulting from the processing to the second radio network entity, wherein the processed information is less data than the one or more bit maps.

19. The radio network in claim 18, wherein the provided information includes information relating to a number of data unit transmission attempts over the communications channel.

20. The radio network in claim 18, wherein the provided information includes one or both of cyclic redundancy check information and quality estimate information for data units transmitted over the communications channel.

21. The radio network in claim 20, wherein the communication is a diversity handover communication including two or more handover links between two or more base stations and the mobile radio, further comprising:

means in the second radio network entity for performing diversity combining one or more data units received over the two or more handover links based on one or both of the cyclic redundancy check information and the quality estimate information.

22. The radio network in claim 18, the second radio network entity further comprising:

means for increasing the target value if the received information reveals an increase in requested retransmissions, and means for decreasing the target value if the received information reveals a decrease in requested retransmissions, wherein an increased target value causes the first means to send one or more increase transmission power control signals to the mobile radio, and a decreased target value causes the first means to send one or more decrease transmission power control signals to the mobile radio.

23. The radio network in claim 18, wherein the target value is a signal to noise ratio or a signal to interference ratio.

24. The radio network in claim 18, wherein the detecting includes detecting signal quality information and cyclic redundancy check information for data units received over the communications channel.

25. The radio network in claim 18, wherein when the first radio network entity includes means for sending a bit map associated with the communication indicating a number of decoding failures for one or more received data units to the second radio network entity.

26. The radio network in claim 25, wherein the second radio network entity includes means for combining bit map information received from plural first entities for the same data unit.

27. The radio network in claim 18, wherein the processed information includes statistical information provided by the mobile radio or the first radio network entity.

28. The radio network in claim 18, wherein the provided information includes statistical information provided by the mobile radio.

29. The radio network in claim 18, wherein the first and second radio network entities are located in a same radio network node.

30. The radio network in claim 29, wherein the second radio network entity includes means for generating the revised target based on the received information and on a new data indicator (NDI) communicated by the mobile radio indicating whether a data unit is a new data unit or a retransmitted data unit.

31. The radio network in claim 30, wherein the first and second radio network entities are located in a base station, the mobile radio communication is a soft handover communication involving first and second base stations, and the NDI indicates a decoding result of the data unit taking into account a data unit decoding at the first base station and a data unit decoding at the second base station.

32. A radio network for communicating with a mobile radio communication over a communications channel, comprising:

first means in a first radio network entity for sending a transmission power control signal to the mobile radio to control a power level at which the mobile radio transmits data units over the communications channel based on a target value;

second means in the first radio network entity for detecting one or more errors in one or more data units received from the mobile radio and requesting retransmission of one or more data units;

third means for providing information associated with the requested retransmission to a second radio network entity; and, fourth means in the second radio network entity for generating a revised target value based on the received information;

wherein when the second means detects a missing or erroneous data unit, the first radio network entity includes means for sending a negative acknowledgement to the mobile radio and an error event indicator to the second radio network entity.

33. The radio network in claim 32, wherein the second radio network entity includes means for ensuring that error event indicators received from plural first entities for the same data unit are only interpreted as one error event indicator.

34. The radio network in claim 32, wherein the second radio network entity includes means for determining an actual data unit transmission failure rate for the communication using one or more error event indicators and for generating the revised target value to reduce a difference between the actual data unit transmission failure rate and a desired data unit transmission failure rate.

* * * * *

UNITED STATES PATENT AND TRADEMARK OFFICE
CERTIFICATE OF CORRECTION

| | | |
|---|---|---|
| PATENT NO. | : 7,920,888 B2 | Page 1 of 1 |
| APPLICATION NO. | : 10/550561 | |
| DATED | : April 5, 2011 | |
| INVENTOR(S) | : Beming et al. | |

It is certified that error appears in the above-identified patent and that said Letters Patent is hereby corrected as shown below:

In Column 7, Line 8, delete "tends fails," and insert -- tends to fail --, therefor.

In Column 12, Line 62, in Claim 17, delete "System," and insert -- system, --, therefor.

In Column 14, Line 8, in Claim 22, delete "signal to noise ratio or a signal to interference" and insert -- signal-to-noise ratio or a signal-to-interference --, therefor.

Signed and Sealed this
Ninth Day of August, 2011

David J. Kappos
*Director of the United States Patent and Trademark Office*